Sept. 4, 1923.
H. D. LAPKIN
1,467,047
PROCESS OF COATING BATTERY ELECTRODES
Filed Nov 4, 1920     2 Sheets-Sheet 2
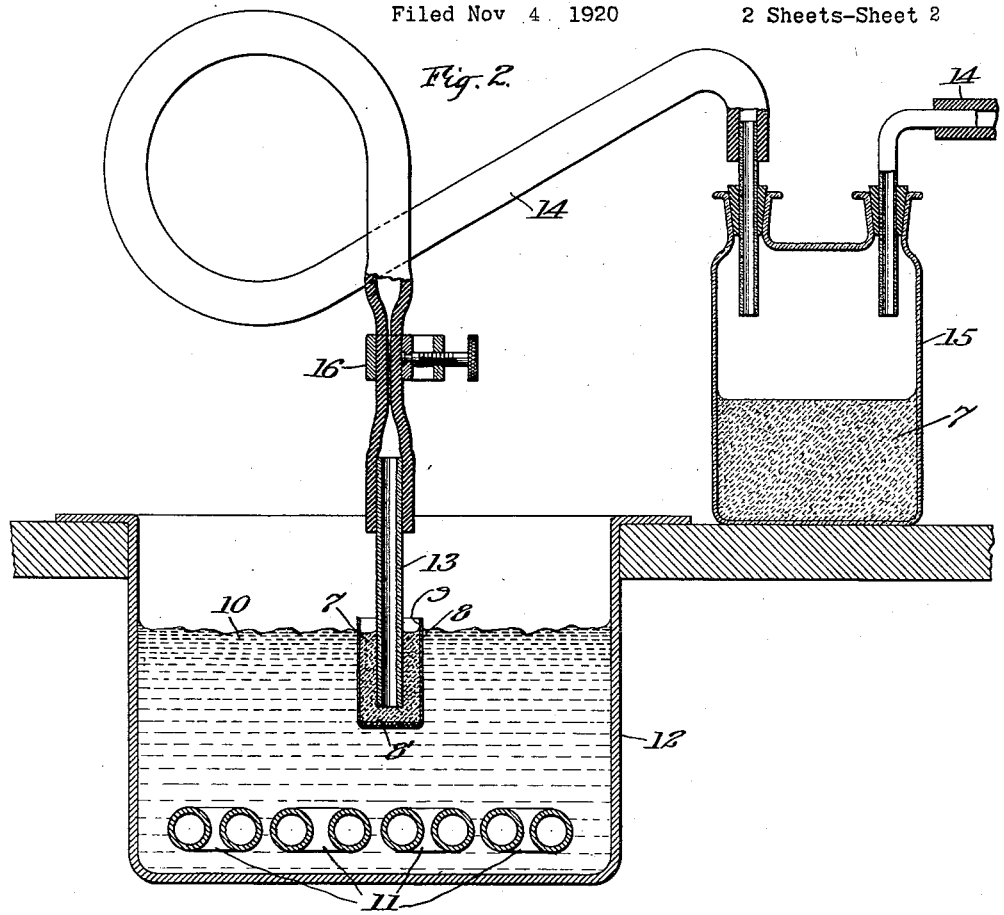
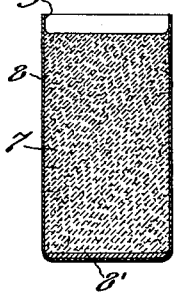 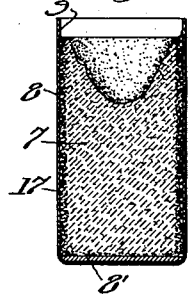 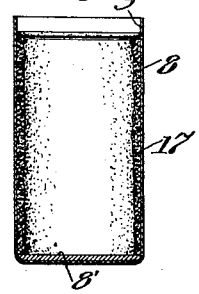

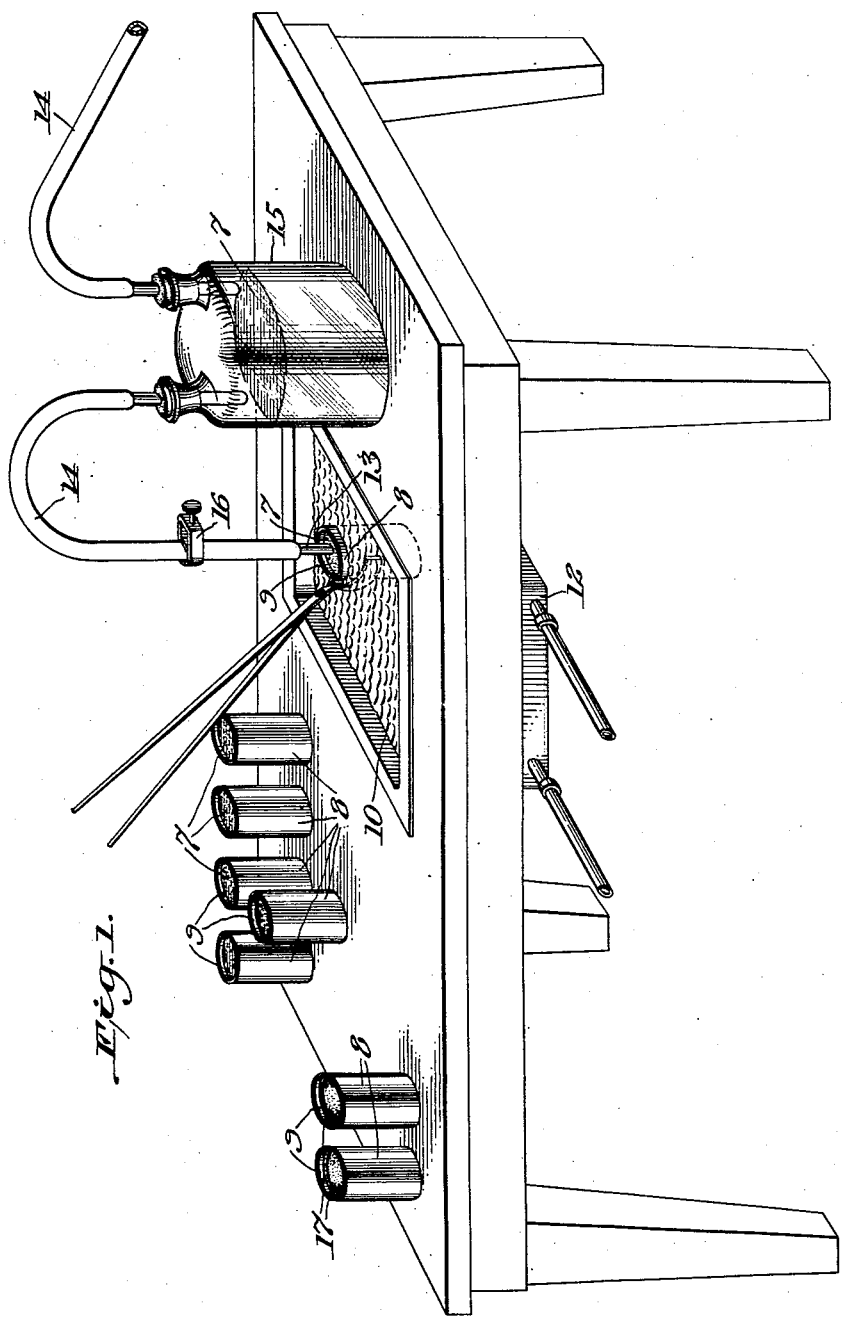

Patented Sept. 4, 1923.

1,467,047

UNITED STATES PATENT OFFICE.

HARRY D. LAPKIN, OF SAN FRANCISCO, CALIFORNIA, ASSIGNOR TO NATIONAL CARBON COMPANY, INC., A CORPORATION OF NEW YORK.

PROCESS OF COATING BATTERY ELECTRODES.

Application filed November 4, 1920. Serial No. 421,752.

*To all whom it may concern:*

Be it known that I, HARRY D. LAPKIN, a citizen of the United States, residing at 615 Central Avenue, San Francisco, in the county of San Francisco and State of California, have invented certain new and useful Improvements in Processes of Coating Battery Electrodes, of which the following is a specification.

In the manufacture of dry cells, it is often desirable to form on the interior of the zinc-cup electrode a protective coating of some bibulous material. This coating may be conveniently formed, for example, by coating the interior of the cup, in any suitable way, with a liquid which is adapted to lose its fluidity on heating, and then heating the cup with its liquid coating to form a thin, firm, coherent layer thereon. An example of a fluid material adapted to form a non-fluid coating on heating, is the electrolyte-containing flour-paste, now in common use.

In application Serial No. 317,580, filed August 14, 1919, by Raymond C. Benner and Harry F. French, there is disclosed a method of coating zinc cups with a layer of cooked paste, the method comprising filling the cups with uncooked paste, inverting the cup to remove all the paste except a layer adhering to the zinc, and then cooking this layer on the zinc. Unless special measures are employed the above method produces a protective layer which extends to the upper edge of the zinc-cup electrode and this is undersirable if the completed cell is to be closed with the usual pitch seal, since the pitch does not make a good joint with the layer of cooked paste.

A principal object of the present invention is to avoid the above mentioned disadvantage. Other objects are the general improvement and simplification of the heretofore proposed processes of coating zinc cups, and these objects will appear more fully from the following description.

I avoid the formation of a layer of cooked paste or the like on the upper part of the zinc cup, intended to receive the seal, by keeping the coating-forming liquid out of contact with the upper portion of the zinc cup throughout the process. If the cups are maintained in their normal upright position, and only partially filled with the coating-forming liquid, it will be apparent that the upper edge of the interior wall of the cup will remain clean. Since, however, the paste or the like required to fill the cup to the upper edge of the desired coating is greatly in excess of that necessary to form the coating, means must be provided for removing the excess without permitting it to come into contact with the upper edge of the cup. A preferred method of effecting the removal of the excess coating-forming liquid is described below by way of example in connection with the annexed drawings, in which Fig. 1 is a perspective view of an arrangement of apparatus for carrying out the invention;

Fig. 2 is a section of certain parts shown in Fig. 1;

Fig. 3 is a section of a zinc cup partially filled with coating-forming liquid;

Fig. 4 is a section of the cup after the portion of the liquid which lies adjacent the zinc has been caused to lose its fluidity by heating, and a portion of the excess liquid has been removed; and Fig. 5 is a section of the coated cup, all the excess liquid having been withdrawn.

The paste or the like 7 is first introduced into the zinc cups 8 provided with the usual pulp-board discs 8' until its upper level rises to within a small but definite distance of the top of the cup as shown in Figs. 1, 2 and 3. The liquid is so introduced that the upper edge 9 of the zinc remains perfectly clean. While maintaining the cup in its upright position, heat is then applied to the cup, as by means of water 10 kept at or near its boiling point by the steam-coils 11 in the water-bath 12. This cooks the paste or the like adjacent the zinc and causes it to lose its fluidity and adhere strongly to the zinc.

After the cup has been in the boiling water from one to five seconds, according to the thickness of the coating desired, the removal of the excess paste begins. The removal is preferably effected by sucking off the paste through a nozzle having a diameter sufficiently large to permit a very rapid withdrawal of the excess material. Such a nozzle is shown in Figs. 1 and 2 at 13, being illustrated as a glass tube, connected by heavy-walled flexible tubing 14 to an exhauster, not shown. A trap 15 is interposed in the vacuum line to receive the excess paste or the like and this may be used to coat other electrodes. A clamp 16 serves to regulate the rate of removal of the liquid.

When the bulk of the fluid paste has been removed, a layer of the fluid paste will still adhere to the cooked, non-fluid coating 17, on the zinc. This is permitted to drain to the bottom of the cup, the nozzle being kept on the bottom to draw off the paste so collected. In the meantime, the cup is kept in the water-bath to cook any paste which does not drain to the bottom, and to insure that the coating shall be dry and coherent. It is usually necessary to continue the heating for 3 to 10 seconds after the bulk of the excess paste is removed. If this heating is unduly prolonged, there will be a tendency for the coating to separate from the cup.

The finished cup carries a coating extending to a point near the top, as best shown in Fig. 5, and this coating will be thin, tough, smooth and dry and well suited for its purpose. The cup is then ready to receive the depolarizing bobbin which may be surrounded with a layer of fluid paste, the subsequent operations on the cell being such as are usually employed in making dry cells.

It will be understood that in many cases it will be desirable to cleanse the cup of all traces of grease and other substances which might prevent adherence of the protective coating, before the paste is introduced.

My invention is subject to many modifications, particularly with regard to the composition of the liquid used to form the coating, and the method of applying the heat necessary to cause a portion of the liquid to lose its fluidity. The specific times mentioned in the description are for illustration only, and may be varied according to the conditions. The apparatus shown by way of example can obviously be modified in various ways.

I claim:

1. Process of forming a coating on a cup-shaped battery electrode which comprises applying to a predetermined portion only of the interior of the cup, a liquid adapted to form a non-fluid coating, an excess of liquid over that required to form the desired coating being used, rendering a portion of the liquid adjacent the cup non-fluent, and then removing the excess liquid while preventing its wetting the cup except at the predetermined portion thereof.

2. Process of forming a coating on a cup-shaped battery electrode which comprises partially filling the cup with a liquid adapted to form a non-fluid coating, rendering a portion of the liquid adjacent the cup non-fluent; and removing the excess liquid without permitting it to wet the upper portion of the interior of the cup.

3. Process of forming a coating on a cup-shaped battery electrode which comprises partially filling the cup with a liquid adapted to form a non-fluid coating, rendering a portion of the liquid adjacent the cup non-fluent, and drawing off the excess liquid by suction.

In testimony whereof I affix my signature.

HARRY D. LAPKIN.